3,440,267
PREPARATION OF ORGANOSILICON CHLORIDES
John L. Speier, Midland, Mich., assignor to Dow Corning Corporation, Midland, Mich., a corporation of Michigan
No Drawing. Filed Dec. 29, 1965, Ser. No. 517,472
Int. Cl. C07f 7/12
U.S. Cl. 260—448.2         5 Claims

ABSTRACT OF THE DISCLOSURE

A method for preparing chlorosilanes by contacting a compound of the group consisting of allylchloride and methallylchloride at atmospheric pressure at a temperature of at least 150° C., with a slurry of silicon and copper in an inert diluent such as mineral oil. The process results in unexpectedly superior yields of desired diallyldichlorosilane or dimethallyldichlorosilane.

---

This invention relates to organosilicon chlorides and more particularly to the production of improved yields of diallyldichlorosilane and dimethallyldichlorosilane.

One of the commercial methods employed in the preparation of alkenyl-substituted chlorosilanes is by the so-called direct process. The direct process method utilizes the reaction of an alkenyl chloride with silicon to produce alkenylchlorosilicon compounds. Generally, the direct process method is carried forward with finely divided silicon in the presence of other metals and catalysts. The alkenyl chloride is passed through the mass containing finely divided silicon at an elevated temperature, e.g., 250° to 500° C.

Illustrative of the direct process method described above is by the passage of allyl chloride over a copper-silicon powder (approximate ratio of 1/9) at a temperature of 250° C. The reaction is exothermic and the temperature rapidly increases to within a range of from 500° to 600° C., resulting in a virtually uncontrollable reaction. It was subsequently determined that the inclusion of gaseous nitrogen in the system would effectively control the temperature to some degree. The distribution of products in the above reaction consists essentially of allyltrichlorosilane, allyldichlorosilane, and diallyldichlorosilane, the chief product being allyldichlorosilane with extremely poor yields of diallyldichlorosilane obtained. The vapor phase reaction herein described is well known and documented in numerous United States patents as well as in a number of texts dealing with this subject matter. However, it is to be noted that said vapor phase reaction results in both an unpredictable distribution of products and insignificant yields of the product most desired, diallyldichlorosilane.

It is equally well known that alkylchlorosilanes can be obtained by technically simple methods while, to some extent, avoiding the disadvantages of the vapor phase method if the alkylchlorides are allowed to react on silicon powder at a temperature of 200° to 350° C. which is suspended in inert diluting agents which maintain their fluidity under the prescribed reaction conditions as specified in German Patent 887,343. Although the production of undesirable products may be reduced, this process suffers from the important disadvantage in that it is necessary that the reaction must be carried out under pressure to achieve practicable results. In the absence of pressure, the process is inefficient and inoperable.

It is an object of this invention to provide a reaction that permits effective control while obtaining significantly improved yields of diallyldichlorosilane or dimethallyldichlorosilane. It is a further object of this invention to provide a means whereby a predictable proportion of these dialkenyl-substituted dichlorosilanes, which are valuable monomers for use in a variety of polysiloxanes in which vinyl siloxane is presently used, can be obtained. It is still a further object to obtain the advantages related herein by a method which is both economical and feasible. These and related objects will become apparent from the following detailed description of the invention.

This invention relates to a method of preparing organosilicon chlorides which comprises contacting a compound of the group consisting of allylchloride and methallylchloride at substantially atmospheric pressure at a temperature of at least 150° C., with a slurry of silicon and metal catalyst in an inert diluent.

The reaction of allylchloride or methallylchloride proceeds quite differently when the silicon-alloy powder is suspended in an inert diluent than it does when the system is reacted in the well known vapor process. The vapor process, even in the absence of a metallic catalyst is extremely exothermic and a major proportion of allyldichlorosilane and low yields of allyltrichlorosilane are obtained. It is to be noted that when the silicon is suspended in an inert diluent, the reaction forms no allyldichlorosilane and the vigorous exotherm of the reaction is easily and readily controlled. In addition, remarkably high yields of desirable diallyldichlorosilane and dimethallyldichlorosilane are obtained.

By the term "inert diluent" as employed herein means that any diluent which is fluid under the prescribed reaction conditions is sufficient to achieve the desired objectives. The selection of the diluent to be employed in the successful practice of this invention therefore is not critical with the exception that said diluent must be nonreactive with respect to the other components present in the system. Thus, any inert diluent such as mineral oil, hydrogenated terphenyl, paraffins, tar or hydrocarbon products, or fluorocarbons among others can be used without detrimental effect to the advantages enumerated hereinbefore, although mineral oil is preferred due to its commercial availability.

The silicon-alloy powder or contact mass is not restricted solely to a mixture of silicon and copper, but can be a mixture of silicon promoted with nickel, cobalt, antimony, phosphorus or other promoter metal alone or in combination, however copper is generally preferred. The known art is replete with references to improved silicon masses which can be effectively utilized in the preparation of silanes, and such masses are within the contemplation of the present invention. Also, it is to be noted that the numerous references relating to improvements obtained by properly adjusting the particle size of the silicon-alloy powder is likewise within the contemplation of the present invention.

The amount of metal employed in the silicon-alloy powder or contact mass is not critical with the exception that at least 0.5 part of metal per 100 parts of silicon should be present. For optimum results, the preferred amount of metal is 2.0 parts per 100 parts of silicon. Although any amount of metal in excess of this figure can be effectively used, it has been found that amounts of metal greatly in excess of 2.0 parts per 100 parts of silicon is both uneconomical and impractical since no substantial enhancement is derived.

The temperature most operative in this invention and at which the reaction best proceeds is within a range of from 150° to 300° C. Although temperatures below 230° C. can be effectively employed, the preferred temperature is within a range of from 230° to 280° C., since the efficiency of the reaction is increased and greater yields of the desired diallyldichlorosilane or dimethallyldichlorosilane is obtained.

The organosilicon chlorides of this invention are generally prepared by passage of the organic chloride into a rapidly stirred suspension in an inert diluent of a silicon-alloy mass and heated at a temperature of from 150° to 300° C. Alternatively, the organic chloride can be passed into the slurry in one of three ways: (1) nitrogen can be bubbled through the organic chloride and the mixed vapors passed through a gas dispersion tube immersed in the slurry, (2) gaseous organic chlorides can be passed directly into the slurry through a gas dispersion tube immersed in the slurry, or (3) the less volatile organic chlorides can be pumped with a syringe pump or added dropwise by use of an addition funnel above the surface of the slurry. The condensate is then collected. In the following examples acetone is used to condense the very low boiling products, and analysis is made by vapor phase chromatography. 1,5-hexadiene, allyltrichlorosilane, and remarkably large yields of diallyldichlorosilane or dimethallyldichlorosilane are obtained. In addition, a slight amount of unknown material and propylene is evolved.

The following examples are intended to aid those skilled in the art in understanding and practicing this invention. The examples do not delineate the scope of the invention.

Example 1

72.8 grams of allyl chloride and mixed vapors of nitrogen were passed at a rate of 0.14 to 0.21 ml. of halide per minute at atmospheric pressure into a rapidly stirred slurry of 200 grams of mineral oil, 50 grams of silicon metal, and 0.1536 gram of copper at 230° C. The amount of copper was slowly increased to 2.14 grams. The following table indicates the composition of the condensate at the various copper concentrations.

| Total Copper (grams) | Condensate (grams) | Area Percent[1] | | | |
|---|---|---|---|---|---|
| | | Allyl chloride | 1,5-hexadiene | $CH_2=CH-CH_2SiCl_3$ | $(CH_2=CH-CH_2)_2SiCl_2$ |
| 0.1536 | 8.53 | >99 | 0 | <1 | 0 |
| 1.1348 | 10.66 | 45.5 | 12.85 | 14.26 | 25.61 |
| 2.1466 | 31.40 | 14.61 | 15.40 | 17.68 | 45.75 |

[1] Small amounts of several unknown compounds were also present.

Example 2

72.8 grams of allyl chloride and mixed vapors was passed rapidly in a rapidly stirred suspension in 200 grams of mineral oil of 5 grams of copper and 45 grams of silicon at varying temperatures. The following table indicates the results obtained.

| | Temperature | | | | | |
|---|---|---|---|---|---|---|
| | 200°–215° C. | | 220°–260° C. | | 280°–300° C. | |
| | Moles | Percent Yield | Moles | Percent Yield | Moles | Percent Yield |
| Products: | | | | | | |
| Allyl chloride | 0.759 | | 0.093 | | 0.0427 | |
| 1,5-hexadiene | 0.0521 | 16.20 | 0.0458 | 10.61 | 0.0312 | 7.27 |
| Allyltrichlorosilane | 0.0326 | 5.06 | 0.0557 | 6.45 | 0.0661 | 7.69 |
| Diallyldichlorosilane | 0.0537 | 16.62 | 0.1750 | 40.60 | 0.181 | 42.25 |
| Slurry gained | | (7.25 g.) | | | | (5.32 g.) |
| | | (36.58 g.) | | | | (5.42 g.) |
| Allyl groups recovered | | 44.5% | | 62.0% | | 59.2% |

Example 3

129.1 grams of methallyl chloride was pumped at a rate of 23.0 ml. per hour into a rapidly stirred mineral oil slurry of 200 containing 5 grams of copper and 45 grams of silicon at varying temperature ranges. The following table indicates the products recovered and identified in the condensate.

| | Temperature of Slurry | | | | | |
|---|---|---|---|---|---|---|
| | 150°–180° C. | | 250° C. | | 300° C. | |
| | Moles | Percent Yield | Moles | Percent Yield | Moles | Percent Yield |
| Products: | | | | | | |
| Isobutylene | 0.119 | 8.15 | 0.234 | 16.48 | 0.248 | 16.76 |
| Several unknowns | (1.98 g.) | | (0.63 g.) | | (1.48 g.) | |
| Methallyl chloride | 0.152 | 10.41 | 0.121 | 8.50 | 0.128 | 8.65 |
| Unknown | 0 | | (3.21 g.) | | (4.98 g.) | |
| 2,5-dimethyl-1,5-hexadiene | 0.1004 | 13.76 | 0.040 | 5.64 | 0.031 | 4.18 |
| Methallyldichlorosilane | 0.028 | 1.91 | 0.041 | 2.88 | 0.063 | 4.25 |
| Methallytrichlorosilane | 0.10 | 6.84 | 0.092 | 6.48 | 0.104 | 7.03 |
| Several unknowns | (9.74 g.) | | | | (6.18 g.) | |
| Dimethallyldichlorosaline [1] | 0.0946 | 12.96 | 0.075 | 10.56 | 0.065 | 8.08 |
| Several unknowns | (80.33 g.) | | (9.48 g.) | | (6.18 g.) | |
| Methallyl groups recovered | | 54.03 | | 50.54 | | 49.67 |

[1] Represents a remarkably high yield of the desired dimethallyldichlorosilane.

Example 4

When hydrogenated terphenyl, paraffins, tar or hydrocarbon products, or fluorocarbons are substituted for mineral oil in the above examples equivalent results are obtained.

Example 5

For comparative purposes to show that alkyl chlorides were inoperative in this invention, 22.4 grams of n-propyl chloride was slowly added dropwise to a rapidly stirred mineral oil slurry of 200 grams containing 45 grams of silicon and 5 grams of copper at a temperature of 295° to 305° C. and at atmospheric pressure. During the reaction a gas was evolved, collected in a gas bag, and identified as propylene. The condensate (28.3 grams) was a mixture of silicon tetrachloride, trichlorosilane, n-propyl chloride, and traces of several unknowns. The slurry was cooled to 250° C. and an additional 22.4 grams of n-propyl chloride was added dropwise over a period of 60 minutes. The condensate (15.8 grams) contained 6.50% and 2.44% of two compounds eluting before trichlorosilane, 17.90% trichlorosilane, 24.4% silicon tetrachloride, and 48.8% n-propyl chloride. No allyl or propylsilanes were detected.

That which is claimed is:

1. A method of preparing chlorosilanes which comprises contacting a compound of the group consisting of allylchloride and methallylchloride at substantially atmospheric pressure at a temperature of at least 150° C., with a slurry of silicon and a promoter metal in an inert diluent.

2. The method as recited in claim 1 wherein the inert diluent is mineral oil.

3. The method as recited in claim 2 wherein the slurry is composed of silicon and copper.

4. The method as recited in claim 3 wherein the slurry is composed of about 2 parts of copper per 100 parts of silicon.

5. The method as recited in claim 4 wherein the temperature is within a range of from 230° to 280° C.

References Cited

UNITED STATES PATENTS 2,420,912   5/1947   Hurd _____ 260—607 XR

OTHER REFERENCES

Eaborn: "Organosilicon Compounds," Academic Press, Inc. (1960), pp. 39 and 40.

Petrov et al.: "Synthesis of Organosilicon Monomers," Consultants Bureau (1964), p. 45.

TOBIAS E. LEVOW, *Primary Examiner.*

J. P. PODGORSKI, *Assistant Examiner.*